(12) United States Patent
Georgy et al.

(10) Patent No.: US 10,132,915 B2
(45) Date of Patent: Nov. 20, 2018

(54) SYSTEM AND METHOD FOR INTEGRATED NAVIGATION WITH WIRELESS DYNAMIC ONLINE MODELS

(71) Applicant: INVENSENSE, INC., San Jose, CA (US)

(72) Inventors: Jacques Georgy, Calgary (CA); Zainab Syed, Calgary (CA); Christopher Goodall, Calgary (CA)

(73) Assignee: InvenSense, Inc., San Jose, CA (US)

( * ) Notice: Subject to any disclaimer, the term of this patent is extended or adjusted under 35 U.S.C. 154(b) by 306 days.

(21) Appl. No.: 14/916,908

(22) PCT Filed: Sep. 5, 2014

(86) PCT No.: PCT/CA2014/000668
§ 371 (c)(1),
(2) Date: Mar. 4, 2016

(87) PCT Pub. No.: WO2015/031979
PCT Pub. Date: Mar. 12, 2015

(65) Prior Publication Data
US 2016/0216360 A1    Jul. 28, 2016

Related U.S. Application Data

(63) Continuation-in-part of application No. 14/130,274, filed on Jun. 27, 2014.
(Continued)

(51) Int. Cl.
*G01S 5/02* (2010.01)
*G01S 19/45* (2010.01)
*H04W 64/00* (2009.01)

(52) U.S. Cl.
CPC ............ *G01S 5/0263* (2013.01); *G01S 5/021* (2013.01); *G01S 5/0252* (2013.01); *G01S 19/45* (2013.01); *G01S 5/0242* (2013.01); *H04W 64/006* (2013.01)

(58) Field of Classification Search
CPC .......... G01S 3/02; G01S 5/0263; G01S 5/021; G01S 19/45; H04W 64/00
(Continued)

(56) References Cited

U.S. PATENT DOCUMENTS 8,570,993 B2 * 10/2013 Austin .................... H04W 4/02
370/338
8,600,411 B2 * 12/2013 Subramanian ...... B61L 15/0027
455/456.3

(Continued)

*Primary Examiner* — Harry K Liu
(74) *Attorney, Agent, or Firm* — Bay Area Technology Law Group PC (57) ABSTRACT

The present disclosure relates to a system and method for integrating online, dynamic wireless system modeling with a navigation solution. The building of wireless dynamic online models for wireless positioning does not require pre-existing information such as pre-surveys and is capable of providing relatively better accuracy. Integration of the wireless positioning using dynamic online models with other navigation systems/solutions is proposed whereby the other navigation system/solution can benefit and enhance the building of wireless dynamic online models. In addition, the wireless dynamic online models can be optimally integrated with the other navigation system/solution for enhanced positioning performance.

47 Claims, 4 Drawing Sheets

Related U.S. Application Data (60) Provisional application No. 61/874,750, filed on Sep. 6, 2013.

(58) Field of Classification Search
USPC .......................................................... 342/451
See application file for complete search history.

(56) References Cited

U.S. PATENT DOCUMENTS

| | | | |
|---|---|---|---|
| 9,226,111 B2* | 12/2015 | Marti | G01S 5/0252 |
| 9,288,632 B2* | 3/2016 | Yang | G01S 5/0252 |
| 2013/0170382 A1* | 7/2013 | Kang | H04W 64/00 |
| | | | 370/252 |
| 2015/0230100 A1* | 8/2015 | Atia | H04W 16/18 |
| | | | 370/252 |

* cited by examiner

| | 120 A RSS | 120 B RSS | 120 C RSS | 120 D RSS | 120 E RSS | 120 F RSS | 120 G RSS |
|---|---|---|---|---|---|---|---|
| Location of 120 A | $RSS_A^{(A)}$ | $RSS_B^{(A)}$ | $RSS_C^{(A)}$ | $RSS_D^{(A)}$ | $RSS_E^{(A)}$ | $RSS_F^{(A)}$ | $RSS_G^{(A)}$ |
| Location of 120 B | $RSS_A^{(B)}$ | $RSS_B^{(B)}$ | $RSS_C^{(B)}$ | $RSS_D^{(B)}$ | $RSS_E^{(B)}$ | $RSS_F^{(B)}$ | $RSS_G^{(B)}$ |
| Location of 120 C | $RSS_A^{(C)}$ | $RSS_B^{(C)}$ | $RSS_C^{(C)}$ | $RSS_D^{(C)}$ | $RSS_E^{(C)}$ | $RSS_F^{(C)}$ | $RSS_G^{(C)}$ |
| Location of 120 D | $RSS_A^{(D)}$ | $RSS_B^{(D)}$ | $RSS_C^{(D)}$ | $RSS_D^{(D)}$ | $RSS_E^{(D)}$ | $RSS_F^{(D)}$ | $RSS_G^{(D)}$ |
| Location of 120 E | $RSS_A^{(A)}$ | $RSS_A^{(A)}$ | $RSS_A^{(A)}$ | $RSS_A^{(A)}$ | $RSS_E^{(E)}$ | $RSS_A^{(A)}$ | $RSS_A^{(A)}$ |
| Location of 120 F | $RSS_A^{(F)}$ | $RSS_B^{(F)}$ | $RSS_C^{(F)}$ | $RSS_D^{(F)}$ | $RSS_E^{(F)}$ | $RSS_F^{(F)}$ | $RSS_G^{(F)}$ |
| Location of 120 G | $RSS_A^{(G)}$ | $RSS_B^{(G)}$ | $RSS_C^{(G)}$ | $RSS_D^{(G)}$ | $RSS_E^{(G)}$ | $RSS_F^{(G)}$ | $RSS_G^{(G)}$ |

SYSTEM AND METHOD FOR INTEGRATED NAVIGATION WITH WIRELESS DYNAMIC ONLINE MODELS

TECHNICAL FIELD

The present disclosure relates to a system and method for integrated navigation integrating online, dynamic wireless system modeling with a navigation solution.

BACKGROUND

The positioning of a moving platform, such as, vehicles, vessels, or individuals, is commonly achieved using known reference-based systems, such as the Global Navigation Satellite Systems (GNSS). The GNSS comprises a group of satellites that transmit encoded signals to receivers on the ground that, by means of trilateration techniques, can calculate their position using the travel time of the satellites' signals and information about the satellites' current location. Such positioning techniques are also commonly utilized to position a device (such as for example, among others, a mobile phone) within or on the moving platform, whether such device is tethered or non-tethered to the moving platform. Currently, the most popular form of GNSS for obtaining absolute position measurements is the global positioning system (GPS), which is capable of providing accurate position and velocity information provided that there is sufficient satellite coverage. However, where the satellite signal becomes disrupted or blocked such as, for example, in urban settings, tunnels and other GNSS-degraded or GNSS-denied environments, a degradation or interruption (i.e. "gap") in the GPS positioning information can result. As a work around, Assisted Global Positioning System (AGPS) receiver chipsets (in addition to significantly improving the startup performance by utilizing network connection) also further use high sensitivity capabilities to provide absolute positions of the platform even in some environments that cannot guarantee clear line of sight to satellite signals. This results in more availability, however, the quality can be poor for such measurements.

In order to achieve more accurate, consistent and uninterrupted positioning information, GNSS information may be augmented with additional positioning information obtained from complementary positioning systems. Such systems may be self-contained and/or non-reference based systems within the device or the platform, and thus need not depend upon external sources of information that can become interrupted or blocked.

One such non-reference based or relative positioning system is the inertial navigation system (INS). Inertial sensors are self-contained sensors within the device or platform that use gyroscopes to measure rate of rotation/angle, and accelerometers to measure specific force (from which acceleration is obtained). Using initial estimates of position, velocity and orientation angles of the device or platform as a starting point, the INS readings can subsequently be integrated over time and used to determine the current position, velocity and orientation angles of the device and its relative misalignment within the platform. Typically, measurements are integrated once for gyroscopes to yield orientation angles and twice for accelerometers to yield position of the device or platform incorporating the orientation angles. Thus, the measurements of gyroscopes will undergo a triple integration operation during the process of yielding position. Inertial sensors alone, however, are unsuitable for accurate positioning because the required integration operations of data results in positioning solutions that drift with time, thereby leading to an unbounded accumulation of errors.

Further problems in providing accurate position or navigation information about a mobile device can arise where the device is capable of moving freely (e.g. without any constraints) or can move with some constraints within the moving platform. Inaccuracies can arise in such cases because the coordinate frame of the inertial sensors (accelerometers and gyroscopes) of the device is not aligned with the coordinate frame of the moving platform. The device and the moving platform can be misaligned with respect to one another, and such misalignment can change over time. For example, where the device moves freely without constraint, the misalignment of the device and the platform can change without constraint. Where the device is capable of constrained movement, the misalignment of the device and the platform can also change, wherein the change is subject to constraints. Where the mobile device is mounted within the platform, there may still be a misalignment where such mounting results in a misalignment between the coordinate frame of the device and the coordinate frame of the platform (although such misalignment would not change over time). It should be noted that a skilled person would know and understand that the misalignment between a mobile device and a moving platform is different than the misalignment that might occur where a navigation module for positioning a moving platform is positioned incorrectly within the moving platform, thereby resulting in a misalignment between the module and the moving platform.

Given that the positioning techniques described above may suffer loss of information or errors in data, common practice involves integrating the information/data obtained from the GNSS with that of the complementary system(s). For instance, to achieve a better positioning solution, INS and GPS data may be integrated because they have complementary characteristics. INS readings are accurate in the short-term, but their errors increase without bounds in the long-term due to inherent sensor errors. GNSS readings are not as accurate as INS in the short-term, but GNSS accuracy does not decrease with time, thereby providing long-term accuracy. Also, GNSS may suffer from outages due to signal blockage, multipath effects, interference or jamming, while INS is immune to these effects.

Although available, integrated INS/GNSS is not often used commercially for low cost applications because of the relatively high cost of navigational or tactical grades of inertial measurement units (IMUs) needed to obtain reliable independent positioning and navigation during GNSS outages. Low cost, small, lightweight and low power consumption Micro-Electro-Mechanical Systems (MEMS)-based inertial sensors may be used together with low cost GNSS receivers, but the performance of the navigation system will degrade quickly in contrast to the higher grade IMUs in areas with little or no GNSS signal availability due to time-dependent accumulation of errors from the INS.

Speed information from the odometric readings when in vehicle together with other corresponding motion constraints, or pedestrian dead-reckoning in case of walking together with other corresponding motion constraints, may be used to enhance the performance of the MEMS-based integrated INS/GNSS solution or replace the full-INS, however, current such systems continue to be plagued with the growth of errors over time during GNSS outages.

It is important to provide absolute updates to the navigation system that is incorporating inertial sensors especially when GNSS is not present or during long GNSS outages such as indoors or in parkades. Although not dedicated for positioning and navigation, several wireless communication systems are now widely used such as for example wireless local area network (WLAN) commonly referred to as "WiFi", which is heavily deployed in indoor environments. These are signals of opportunity and can be used in positioning. Thus, wireless positioning requires getting information from wireless transceivers at different user locations. Different techniques for wireless positioning might be used, with different accuracies, such as for example, time of arrival, time difference of arrival, angles of arrival, received signal strength, and fingerprinting techniques, among others. Some of the common techniques used for wireless positioning with better accuracies are through wireless information being mapped in databases by deploying pre-surveys of the indoor environments which is then used to estimate the user positions. This is a drawback for these techniques. Some other techniques do not need pre-existing information, but they suffer from decreased accuracy.

U.S. patent application Ser. No. 14/130,274, incorporated herein by reference, teaches wireless positioning without need of pre-existing information such as pre-surveys and capable of providing relatively better accuracy. Although that patent teaches the building of wireless dynamic online models for wireless positioning, it does not contemplate the integration of the proposed wireless positioning using dynamic online models with other navigation systems/solutions, nor how the other navigation system/solution can benefit and enhance the building of wireless dynamic online models, as well as how the wireless dynamic online models can be optimally integrated with the other navigation system/solution for enhanced positioning performance.

Hence, there is a need to provide enhanced positioning performance from an integrated navigation system that utilizes wireless positioning with other sensors and systems, where the wireless positioning does not need pre-existing information such as pre-surveys while still providing improved accuracy.

SUMMARY

The present disclosure relates to a system and method for integrating online, dynamic wireless system modeling with a navigation solution, for providing an enhanced integrated navigation solution of a device.

According to embodiments herein, the wireless system modeling is capable of building automatic, online, dynamic model(s) to calculate, predict or estimate the received signal strength (RSS) of a signal transmitted by at least one transceiver. The wireless system can be of any type, such as for example, WiFi system among others. The system automatically processes the info that identifies the location of the transceiver and builds a model to calculate, predict or estimate the RSS of the transceivers. Optionally, the system can rank the transceivers according to the positioning discrimination significance when building the model or when using it.

The integrated navigation solution may have a motion model such as for example: (i) dead reckoning such as among others Pedestrian dead reckoning (PDR), vehicle dead reckoning, and cycling dead reckoning; (ii) inertial navigation; (iii) integrated inertial navigation with GNSS; (iv) integrated inertial navigation with PDR; (v) integrated inertial navigation with vehicle dead reckoning (using for example an odometer or wheel encoders); (vi) integrated inertial navigation with cycling dead reckoning; (vii) inertial navigation with motion constraints; (viii) inertial navigation with user context aiding; (ix) any combination of the above mentioned navigation systems; or (x) any integrated navigation system.

The integration of the wireless system modeling with the navigation solution can be in one of the following manners: (i) loosely coupled; (ii) tightly coupled; (iii) deeply coupled; or (iv) any combination of loosely, tightly and/or deeply coupled. The combination may depend on the accuracies of the navigation system.

In some embodiments, the wireless system modeling can be used to provide updates to the navigation solution. The updates can be provided in a loosely coupled manner in which the positions calculated based upon the wireless system models are used to update the positions calculated by the navigation method.

In some embodiments, a tight integration is also possible in which the RSS information or the distance obtained thereof is directly used to update the navigation solution instead of the computed positioning solution from the wireless system.

In some embodiments where deeply coupled integration is used, the navigation solution or its motion model outcomes are utilized to dynamically build or to assist in building wireless models online, or to online dynamically calculate/estimate either parameters or outputs of the wireless models. In some other embodiments where deeply coupled integration is used, the present integrated navigation solution or its motion model outcomes may be used to verify said online built wireless models from the wireless measurements. The wireless models may be corrected accordingly by changing the parameters used to build the models until an accepted small level of error is obtained. In some of the above embodiments that utilize deeply coupled integration, the wireless system modeling can be used to provide updates to the navigation solution whether position updates (in a similar manner to the loosely coupled integration) or RSS or distance updates (in a similar manner to the tightly coupled integration).

The integrated navigation solution can utilize any type of state estimation techniques or filters, whether linear or non-linear, such as for example Kalman filter or Particle filter among others.

In some embodiments, the present system and method further provide a means of estimating or predicting the locations of the at least one wireless transceivers in the wireless network area. In some embodiments, the navigation system and/or the motion model outputs are utilized for the estimation or prediction of the locations of the at least one wireless transceivers in the wireless network area or to assist such estimation or prediction.

In some embodiments, the present system and method further are capable of performing multipath assessment and rejection for the wireless signals and measurements. This multipath assessment and rejection can be performed using the navigation system and/or the motion model outputs.

In some embodiments, the present system and method is further capable of ranking or ordering the at least one transceiver means in the wireless network according to the positioning discrimination significance. The obtained ranking can be further used to estimate the expected error or accuracy measure of the measurements from the corresponding transceiver means, or the position derived therefrom.

In some embodiments, the wirelessly transmitted signals and/or measurements may be pre-processed to reduce or cancel any noise and/or to smooth the measurements, as necessary. The noise cancellation step may be performed using any de-noising, smoothing, or filtering algorithm.

DESCRIPTION OF EMBODIMENTS

The present disclosure relates to a system and method for integrating online, dynamic wireless system modeling with a navigation solution. This integrated navigation system provides an enhanced navigation solution of a device within a platform (such as for example person, vehicle, or vessel), wherein the device can be strapped or non-strapped within the platform, wherein the device is non-strapped the mobility of the device may be constrained or unconstrained within the platform, and wherein the device can be tilted to any orientation and still provide a seamless navigation solution without degradation in performance of said navigation solution.

The device is "strapped", strapped down, or tethered to the platform when it is physically connected to the platform in a fixed manner that does not change with time during navigation. In the case of strapped devices, the relative position and orientation between the device and platform does not change with time during navigation. The device is "non-strapped", or non-tethered when the device has some mobility relative to the platform (or within the platform). This means that the relative position or relative orientation between the device and platform may change with time during navigation. The device may be "non-strapped" in two scenarios: where the mobility of the device within the platform is "unconstrained", or where the mobility of the device within the platform is "constrained". One example of "unconstrained" mobility may be a person moving on foot and having a portable device such as a smartphone in the their hand for texting or viewing purposes (hand may also move), at their ear, in hand and dangling/swinging, in a belt clip, in a pocket, among others, where such use cases can change with time and even each use case can have a changing orientation with respect to the user. Another example where the mobility of the device within the platform is "unconstrained" is a person in a vessel or vehicle, where the person has a portable device such as a smartphone in the their hand for texting or viewing purposes (hand may also move), at their ear, in a belt clip, in a pocket, among others, where such use cases can change with time and even each use case can have a changing orientation with respect to the user. An example of "constrained" mobility may be when the user enters a vehicle and puts the portable device (such as smartphone) in a rotation-capable holder or cradle. In this example, the user may rotate the holder or cradle at any time during navigation and thus may change the orientation of the device with respect to the platform or vehicle.

The wireless system modeling is capable of building automatic, online, dynamic model(s) to calculate, predict or estimate the received signal strength (RSS) of a signal transmitted by at least one transceiver. The wireless system can be of any type, such as for example, WiFi system among others. The system automatically processes the info that identifies the location of the transceiver and builds a model to calculate, predict or estimate the RSS of the transceivers. Optionally, the system can rank the transceivers according to the positioning discrimination significance when building the model or when using it.

The integrated navigation solution may have a motion model such as for example: (i) dead reckoning such as among others Pedestrian dead reckoning (PDR), vehicle dead reckoning, and cycling dead reckoning; (ii) inertial navigation; (iii) integrated inertial navigation with GNSS; (iv) integrated inertial navigation with PDR; (v) integrated inertial navigation with vehicle dead reckoning (using for example an odometer or wheel encoders); (vi) integrated inertial navigation with cycling dead reckoning; (vii) inertial navigation with motion constraints; (viii) inertial navigation with user context aiding; (ix) any combination of the above mentioned navigation systems; or (x) any integrated navigation system.

Figure 1:
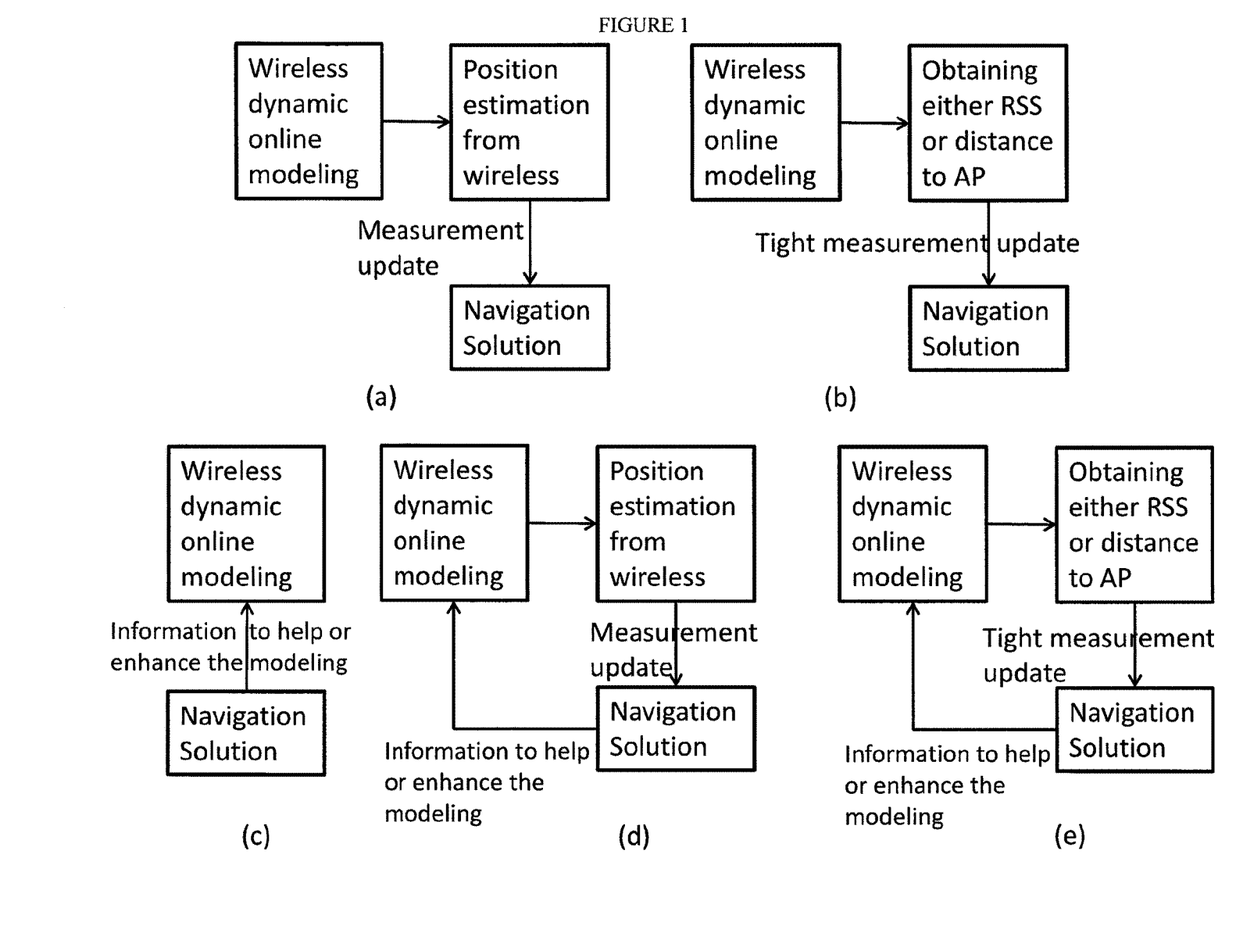
FIG. 1 shows block diagrams of some embodiments of the present method having loosely coupled integration (a), tightly coupled integration (b), navigation solution aiding the wireless modeling (c), deeply coupled integration (d), or another embodiment for deeply coupled integration (e)
Figure 2:
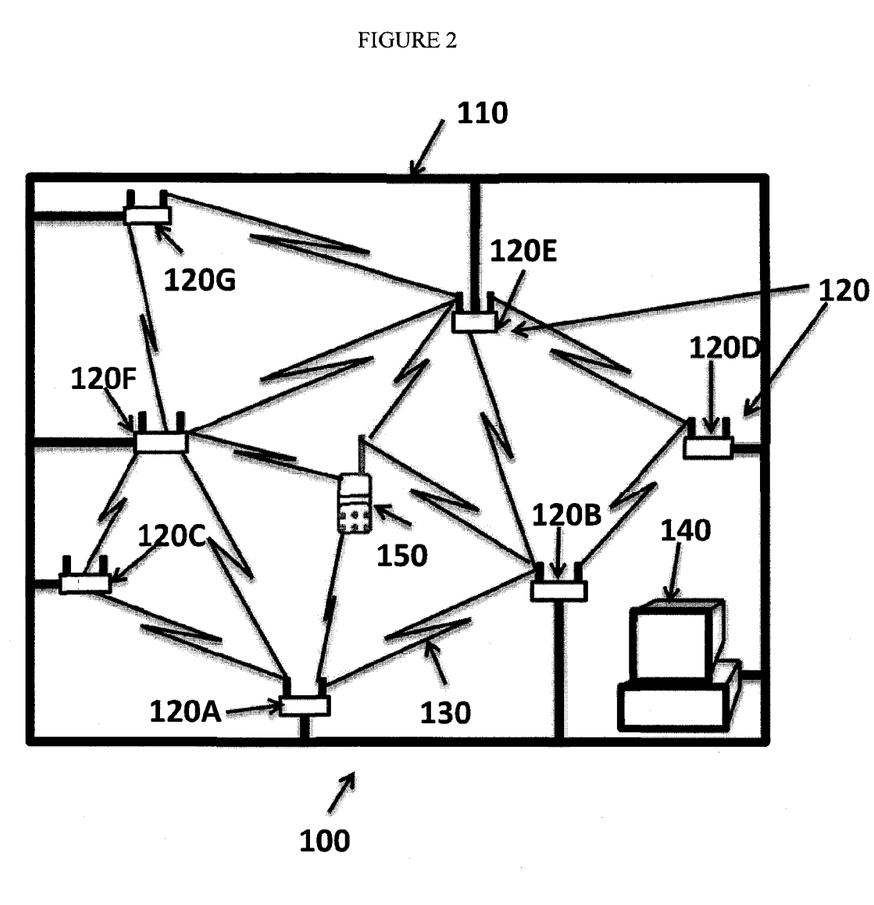
FIG. 2 shows an example of a WLAN area.

The integration of the wireless system modeling with the navigation solution can be in one of the following manners: (i) loosely coupled; (ii) tightly coupled; (iii) deeply coupled; or (iv) any combination of loosely, tightly and/or deeply coupled. The combination may depend on the accuracies of the navigation system. FIG. 2 shows block diagrams of some embodiments of the present method. FIG. 1(a) shows a block diagram for one embodiment of the present method when using loosely coupled integration. FIG. 1(b) shows a block diagram for one embodiment of the present method when using tightly coupled integration. FIG. 1(c) shows a block diagram for one embodiment of the present method when the navigation solution is aiding the wireless modeling. FIG. 1(d) shows a block diagram for one embodiment of the present method when using deeply coupled integration, wherein position from the wireless model is used as update for the navigation solution. FIG. 1(e) shows a block diagram for one embodiment of the present method when using another option for deeply coupled integration, wherein either RSS or distance to the access point (AP) is used to update the navigation solution.

In some embodiments, the wireless system modeling can be used to provide updates to the navigation solution. The updates can be in a loosely coupled manner in which the positions calculated based upon the wireless system models are used to update the positions calculated by the navigation method.

In some embodiments, a tight integration can be used where the RSS information or the distance obtained therefrom can be used to directly update the navigation solution instead of the computed positioning solution from the wireless system.

In some embodiments deeply coupled integration is used. This type of integration provides aiding for the wireless system modeling using the information from the integrated navigation solution, as well as the wireless models can be used to aid the navigation solution. This type of integration provides advantages over other integration schemes as it can provide useful aiding for building the wireless models online and/or during the estimation of RSS. In some embodiments where deeply coupled integration is used, the present integrated navigation solution or its motion model outcomes are utilized to dynamically build or to assist in building wireless models online, or to online dynamically calculate/estimate either parameters or outputs of the wireless models. In some embodiments once the online modeling and/or estimation are completed, the deep integration may be mainly aiding the integrated navigation solution, in some other embodiments both the navigation solution and the wireless modeling can be aiding each other. In some other embodiments where deeply coupled integration is used, the present integrated navigation solution or its motion model outcomes may be used to verify said online built wireless models from the wireless measurements. The wireless models may be corrected accordingly by changing the parameters used to build the models until an accepted small level of error is obtained. In some of the above embodiments that utilize deeply coupled integration, the wireless system modeling can be used to provide updates to the navigation solution whether position updates (in a similar manner to the loosely coupled integration) or RSS or distance updates (in a similar manner to the tightly coupled integration).

Any combination of loosely, tightly and/or deeply coupled integration scheme may be used as well. The combination may depend on the accuracies of the navigation system.

A filtering or state estimation technique, whether linear or nonlinear, can be used to perform the present integration. In case the underlying motion models and/or the wireless models are non-linear, either: (i) linearized models are used with linear integration techniques, such as for example the Kalman filter (KF), Linearized KF, or Extended KF, or (ii) any non-linear integration technique such as for example, particle filter, genetic algorithm, neural network, among others may be used directly, eliminating the need of linearization.

The integrated navigation solution and the motion models it may comprise can be any one of the following, among others:

1) Integration of wireless system modeling with dead reckoning: Dead reckoning refers to estimating a new set of positioning information based on a previous set of positioning solution.
    a. Where the moving platform is a pedestrian, the dead reckoning is referred to estimating the new position of the user at every step. The stride length and the heading of the user are used to get the change in position, which is then added to the previous position.
    b. Where the moving platform is a vehicle or robot, for example, the dead reckoning can make use of vehicle speed with the heading information to propagate the previous position to the new location. Dead reckoning provides relative positions; however, the errors accumulate with respect to time.
    c. Where the moving platform is a cycling platform, for example, the dead reckoning can be achieved whether for strapped sensors such as odometers or wheel encoders or with portable devices that may not have any connection to strapped sensors on the bicycle body. The former gets the bicycle speed from the strapped sensors while the latter should run a routine to detect pedaling, then detect cycles, and have or build models that estimate traveled distance and/or speed as a function of the detected cycles and their frequencies. That information together with the heading information are used to propagate the previous position to the new location. Dead reckoning provides relative positions; however, the errors can accumulate with respect to time.
2) Integration of wireless system modeling with inertial navigation: inertial navigation uses mechanization equations to compute a relative navigation solution. This solution drifts with time due to integration of errors through mechanization equations. The present wireless system models or the outcome thereof can be used as updates to limit the drift errors.
3) Integration of wireless system modeling with integrated inertial navigation with GNSS: Integrated inertial navigation with GNSS can be used as a solution to bridge short GNSS outages. Any long indoor duration will result in accumulation of errors. The present wireless system models or the outcome thereof can be used as updates to limit the drift errors for long GNSS outage durations.
4) Integration of wireless system modeling with integrated inertial navigation with PDR (both with and without GNSS): For long indoor trajectories, the PDR can be used as updates to the inertial navigation. Such updates, although relative, reduces the errors in the position directly, and indirectly reduces the errors in other navigation parameters. Such integrated system still has a need for absolute updates from wireless system models or the outcome thereof to limit the drift errors (e.g. in cases where GNSS is not present or during GNSS outages).
5) Integration of wireless system modeling with integrated inertial navigation with vehicle dead reckoning (both with and without GNSS): Inertial navigation can significantly improve if vehicle dead reckoning is used for updates. Such a system can maintain reliability over long durations. However, the underlying drifts will still make the overall positioning solution unreliable unless absolute updates become available. The absolute updates can be from wireless system modeling in the absence of GNSS updates. This situation can be used in indoor parking lots or long tunnel systems for vehicles or indoors for robots, where the wireless system models or the outcome thereof can mitigate the drift in the navigation solution.
6) Integration of wireless system modeling with integrated inertial navigation with cycling dead reckoning (both with and without GNSS): Inertial navigation can significantly improve if cycling dead reckoning is used for updates. Such a system can maintain reliability over long durations. However, the underlying drifts will still make the overall positioning solution unreliable unless absolute updates become available. The absolute updates can be from wireless system modeling in the absence of GNSS updates. This situation can be used in indoor parking lots or long tunnel systems for bicycles, where the wireless system models or the outcome thereof can mitigate the drift in the navigation solution.
7) Integration of wireless system modeling with inertial navigation with motion constraints (both with and without GNSS): Motion constraints are useful to limit the integration error and may be implemented with the inertial navigation. Such system still needs absolute updates to keep the drifts within acceptable levels. Integration with wireless system models or the outcome thereof is one of the means for minimizing the drift errors (e.g. in cases where GNSS is not present or during GNSS outages).
8) Integration of wireless system modeling with inertial navigation with user context aiding (both with and without GNSS): In the absence of any other information, the inertial navigation can rapidly become useless (e.g. in a of seconds). If available, user context information can aid the inertial navigation to limit the growth of errors, however, integration with wireless system models or the outcome thereof is needed to mitigate the drift in the navigation solution (e.g. in cases where GNSS is not present or during GNSS outages).

9) Integration of wireless system modeling with any combination of the above mentioned navigation systems: the present wireless system models or the outcome thereof can be integrated with any combination of the above mentioned navigation solutions/systems, enabling decreased and mitigated drift in the navigation solution.

10) Integration of wireless system modeling with any integrated navigation system: the wireless system models or the outcome thereof can be integrated with any navigation solution/system, enabling decreased and mitigated drift in the navigation solution.

The present wireless system can be operable in a wireless network-enabled area (e.g. an area covered by a wireless network infrastructure), such as for example an area having wireless local area network (WLAN) coverage. FIG. 2 shows an embodiment of the present system 100 comprising a wireless network having at least one transceiver means 120 capable of and/or receiving a wireless signal. In some embodiments, the wireless network may be the known IEEE 802.11 WLAN known as "Wi-Fi", and the at least one transceiver means may comprise Wi-Fi access points (APs), which may or may not be fixed in one particular location within the targeted area. In some embodiments, the at least one wireless transceiver may be capable of acting as a gateway between the wireless network and a wired network 110.

Regarding the wireless modeling (i.e. the automatic, online, dynamic building of model(s)) the present system and method are capable of processing transmitted wireless signals in the area to dynamically build the wireless model(s) such as online propagation model for each available transceiver means, online power profiles of each available transceiver means and/or online radio map of the targeted area. Optionally the wireless modeling can be further improved by first locating the at least one transceiver means within the area and/or by second distinguishing and ranking the at least one transceiver means in the area according to the location discrimination significance of the at least one transceiver means.

The at least one transceiver means may transmit a wireless signal comprising a "power pattern", wherein the power pattern relates to information identifying the at least one transceiver transmitting the power pattern ("transmitting transceiver") and the transmitting signal strength thereof, as well as information identifying any other at least one transceiver means that may be "visible" ("visible transceiver(s)") to the transmitting transceiver and the received signal strengths of the signals transmitted by the visible transceiver(s) as measured by the transmitting transceiver at its particular location. The power pattern may be transmitted via a wired or wireless communication media. It is understood that the transmitting transceiver can determine its own transmitting power from within its own wireless circuitry (such as by taking into account the gains of the wireless antennas' of the transceiver).

For example, the transceiver 120A may receive wireless signals from other visible transceivers 120B, 120C, and 120F, and can process same along with its own transmitting power to provide a power pattern output having information identifying transceiver 120A and the signal strength of signals transmitted by transceiver 120A, as well as information identifying other visible transceivers 120B, 120C, and 120F and the signal strengths of signals transmitted by visible transceivers 120B, 120C, and 120F, as measured by transceiver 120A at its particular location within the area. In one embodiment, the information identifying the at least one transceiver 120A may be the Media Access Control address (MAC address).

The present system may optionally further comprise at least one processing means 140 capable of exchanging information with the at least one transceiver means 120. The at least one processing means 140 may exchange information with the at least one transceiver means 120 through one or more wired or wireless communication channels. For example, having regard to FIG. 2, the at least one processing means 140 may be a computer server. In one embodiment, the at least one transceiver means 120 may send power patterns to the at least one processing means 140 through a wired network 110. In another embodiment, the at least one transceiver means 120 may send power patterns to the at least one processing means 140 wirelessly through at least one transceiver means 120 which, in turn, may route the wirelessly received power patterns to the at least one processing means 140 through the wired network 110. The at least one processing means 140 may utilize the received power patterns to identify the locations of the at least one transceiver means 120 having transmitted a power pattern. For instance, the location information about the at least one transmitting transceiver means 120 may be embedded within the power patterns themselves, or may be obtained and determined by the at least one processing means 140 and indexed by the identification information of the at least one transmitting transceiver means 120.

Where the location information of the at least one transmitting transceiver means is embedded in the power patterns, the location may be obtained by decoding the power patterns. Alternatively, the location may be obtained by looking up the information in a table containing the locations of the at least one transceivers indexed by an identification information of the at least one transceiver means (such as for example the Media Access Control (MAC) address). The table may be saved, and can be updated manually or automatically whenever changes occur to the number and/or location of the at least one transceiver means within the area.

Figure 3:
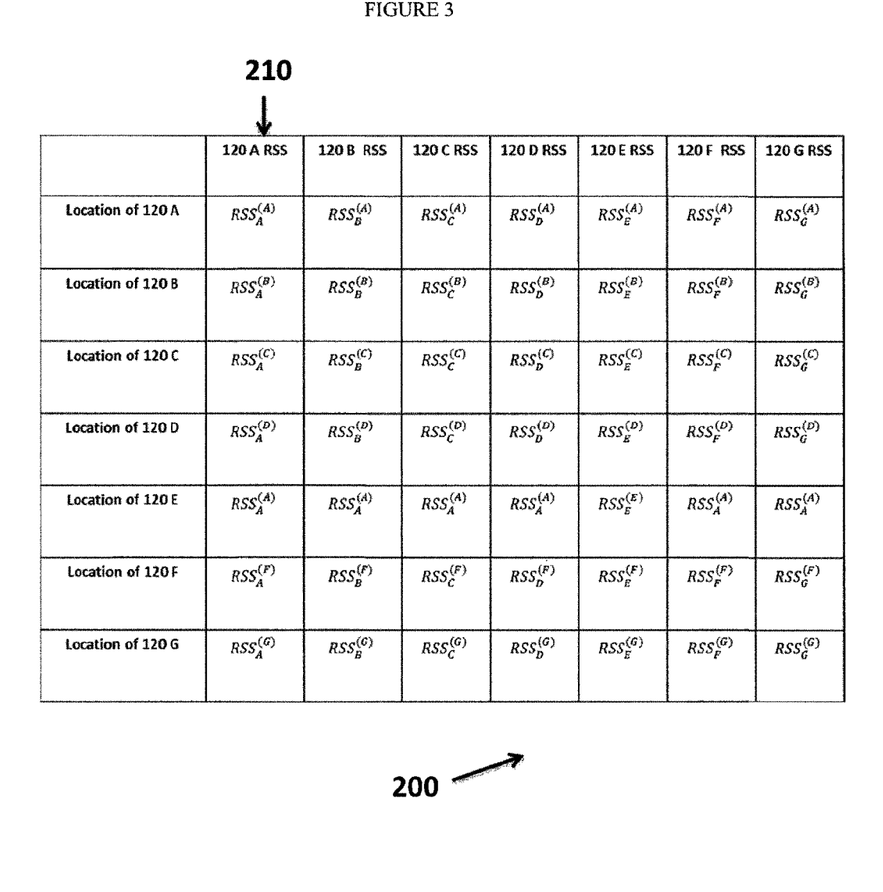
FIG. 3 shows an exemplary online measurement table obtained from power patterns transmitted by the transceiver means shown in FIG. 2.

Having the locations of the at least one transceiver means, an "online measurement table" may be created, wherein each row of the table contains the location of the at least one transceiver means and the signal strength of the signals transmitted thereby as received and measured at other at least one transceivers at their particular locations. For example, $RSS_B^{(A)}$ means the received signal strength of signals transmitted by transceiver means B and received by transceiver means A at the current location of transceiver A.

Having the built online measurement table, online dynamic building of wireless models such as online propagation model for each at least one transceiver means, online power-profile for each at least one transceiver means, and/or online radio map of the wireless network area can occur. By way of definition, a "propagation-model" is a model that relates the received signal strength of signals transmitted by at least one transceiver means to a distance from that transceiver means. A "power-profile" of an at least one transceiver means is a model that predicts the received signal strength of signals transmitted by the at least one transceiver means at any given location in the wireless network area. A "radio map" of the wireless network area is a model that relates the received signal strength of signals transmitted by the least one transceiver means in the wireless network directly to a known location in the area if the said signals received at this known location. A radio map can be obtained by merging power-profiles from a plurality of transceivers in a wireless network area.

Figure 4:
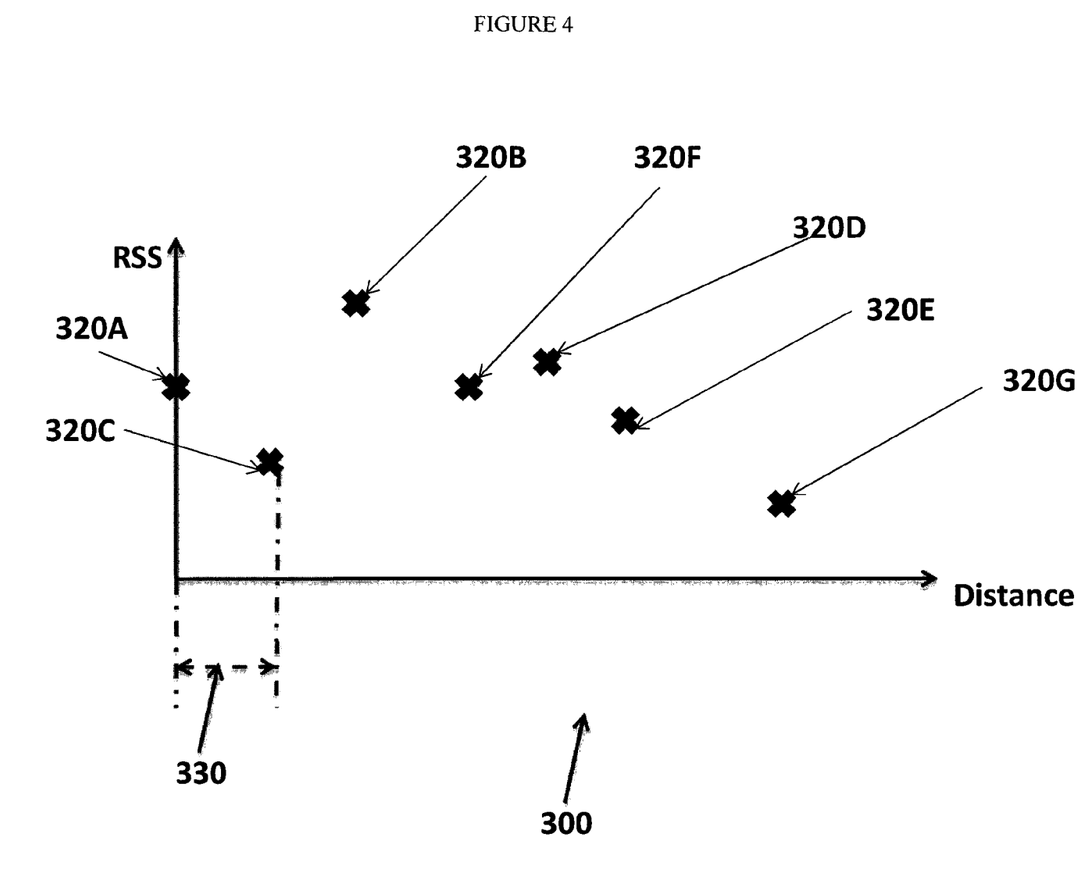
FIG. 4 depicts the signal strength measurements (y-axis) vs. distance (x-axis) from the transceiver means 120A shown in FIG. 2.

In some embodiments, an improved online propagation-model of a transceiver means "A" can be obtained from recent (new) online measurements found in the corresponding column of transceiver "A" from the online measurement table. For example, having regard to FIG. 3, an improved online propagation-model of at least one transceiver means 120A can be obtained from recent (new) online measurements found in column 210 of table 200. Having regard to FIG. 4, each data point within the column 210 can be plotted such that the vertical value of a data point 320C (or 320B-320G) represents the received signal strength of signals transmitted by transceiver means 120A and received by transceiver means 120C (or 120B-120G) ($RSS_A^{(C)}$) and the horizontal value of data point 320C represents the distance 330 between transceiver means 120A and transceiver means 120C.

As such, the present system attempts to provide improved methods of building online wireless model(s) such as propagation-models of the at least one transceiver means, online power-profiles of the at least one transceiver means and/or an online radio map of the wireless network area. In addition, the present system can provide an expected error or accuracy measure with the results of the obtained wireless model(s).

The present wireless model(s) can be integrated with navigation systems and the integration scheme may be loosely coupled, tightly coupled, or deeply coupled, or a combination thereof. In the case where loosely coupled integration is used, the expected error calculated with the obtained wireless model(s) may be further used to calculate an expected error of position calculated using the said wireless model(s). This expected error may be used as an accuracy measure (such as for example a standard deviation) for the position update from wireless positioning to the navigation system. In case where tightly coupled integration is used, the expected error calculated with the obtained wireless model(s) may be further used as an accuracy measure (such as for example a standard deviation) affecting or contributing to the tight wireless update to the navigation system. In the case where deeply coupled integration is used, the expected error calculated with the obtained wireless model(s) may be further used as an accuracy measure (such as for example a standard deviation) affecting or contributing to the wireless update to the navigation system.

In the case where deeply coupled integration is used, the navigation system or its motion model outcomes may help the online dynamic building of the wireless models or the calculation/estimation of either parameters or outputs thereof.

Having regard to online building of a propagation model, a mathematical approach using known mathematical formulae (such as for example the common logarithmic decay formula) and estimating the parameters thereof can be used, a probabilistic approach can be used, or a hybrid approach that can combine known mathematical formulae and the probabilistic approach can be used. For example, and having regard to FIG. 4, in the case of using a mathematical formulae, such a formula can be best fitted to data points 320A to 320G for transceiver means 120A obtained from column 210. An expected error or accuracy measure can be also provided with the built propagation model. In the case where deeply coupled integration is used, the navigation system or its motion model outcomes may help any one of the mathematical, probabilistic, or hybrid approaches in the online dynamic building of the propagation model(s) and/or the calculation of the corresponding expected error or accuracy measure.

Having regard to online building of a power profile, an improved means of building online power-profiles for each at least one transceiver means is provided through the building of an online measurement table from the information or power pattern for each of the at least one transceiver means. In order to obtain a power profile for transceiver means "A", data points for transceiver means "A" obtained from its corresponding column of the online measurement table can, for example, be initially used with a probabilistic method, a mathematical method with known mathematical formulae, and/or a hybrid method combining the probabilistic method with known mathematical formulae, where the initial data points and the method can provide a probability distribution of the received signal strength of the signal transmitted by transceiver means "A" and received at any given location within the area. One example of mathematical formulae that may be used can be the common logarithmic decay formula. An expected error or accuracy measure can be also provided with the built power profile. In the case where deeply coupled integration is used, the navigation system or its motion model outcomes may help any one of the mathematical, probabilistic, or hybrid approaches in the online dynamic building of the power profile(s) and/or the calculation of the corresponding expected error or accuracy measure.

Having regard to online building of a radio map, in addition to the methods provided herein for building an online power-profile for each transceiver means in the wireless network using online measurements similar to those in online measurement table, an online radio map can be obtained by merging all power-profiles together such that a prediction of the received signal strength of signal transmitted from at least one transceiver means at any given position in the area with any required resolution and an accuracy measure thereof can be obtained. In one embodiment, an accuracy measure can be calculated by averaging the expected error calculated in the power profiles at any given location, thereby obtaining an overall expected error of the predicted received signal strength of signals transmitted from the at least one transceiver means in the area at the particular location. In the case where deeply coupled integration is used, the navigation system or its motion model outcomes may help in the online dynamic building of the radio map and/or the calculation of the corresponding expected error or accuracy measure.

In the case where deeply coupled integration is used, the navigation system or its motion model outcomes may be used to verify the online built wireless model(s) such as propagation-models, power-profiles and/or radio map. The wireless model(s) may be corrected accordingly by changing the parameters used to build the model(s) until an accepted error is obtained.

In some embodiments, the wirelessly transmitted signals may be pre-processed to reduce or cancel any noise and/or to smooth signal strength measurements, as necessary. The signal strength noise cancellation step may be performed using any de-noising, smoothing, or filtering algorithm.

In some embodiments, the present system and method further are capable of performing multipath assessment and rejection for the wireless signals and measurements. Optionally this multipath assessment and rejection is performed using the navigation system and/or the motion model outputs.

In some embodiments, several wireless model(s) such as propagation model(s), power profile(s), radio map, or a combination thereof may be integrated and/or provide updates to the navigation system.

In some embodiments, the present system and method further provide a means of estimating or predicting the locations of at the least one wireless transceivers in the wireless network area. In some embodiments, the navigation system and/or the motion model outputs are utilized for the estimation or prediction of the locations of the at least one wireless transceivers in the wireless network area or to assist such estimation or prediction. The estimation or prediction of the locations of the at least one wireless transceivers in the wireless network area may be used where the wireless system is to be utilized in an unknown wireless network area that would typically require pre-existing knowledge about the locations of the at least one transmitting means that constitute the wireless infrastructure. This may also be used in circumstances where the wireless network area is an unknown indoor area and the locations of the transmitting means that constitute the wireless infrastructure are not known.

In some embodiments, the present system and method is further capable of ranking or ordering the at least one transmitting means in the wireless network according to the positioning discrimination significance. The obtained ranking can be further used to estimate the expected error or accuracy measure of the built wireless model(s), the output thereof or the position derived therefrom, where the building of the models, the usage of the models or the positioning was calculated or estimated using the ranked at least one transmitting means. For example, the ranked transmitting means can be divided into groups such as ("high quality", "medium quality", "low quality") and then based on the quality group that the majority of transmitting means used belong to, an accuracy measure can be determined. In another example, the ranks of the transmitting means can be seen as weights and the accuracy measure corresponding to the used transmitting means can be a weighted average of individual accuracy measures of the used transmitting means.

The present system and method may improve the performance of the integration of the wireless model(s) with the navigation system by either using only the most significant at least one transceiver means in the building of the model(s) or by choosing the model(s) corresponding to the most significant at least one transceiver means to be integrated with the navigation system, thereby reducing the effects of signal noises and redundancies resulting from including insignificant transceiver means.

It is understood that while the transmitting means are referred to herein as transceiving means, the transmitting means need not necessarily be a transceiver means comprising a receiving means.

Contemplated Embodiments

It is contemplated that the present system and method can be combined with a mode of conveyance technique or a mode detection technique to establish the mode of conveyance. This enables the discrimination of different scenarios such as for example walking, running, cycling and in vessel (car, bus, train, . . . ) among other possible modes.

It is further contemplated that the present method and apparatus can be used with a navigation solution that may optionally utilize automatic zero velocity periods or static period detection with its possible updates and inertial sensors bias recalculations, non-holonomic updates, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that the present method and apparatus can be used with a navigation solution that is further programmed to run, in the background, a routine to simulate artificial outages in the absolute navigational information and estimate the parameters of another instance of the state estimation technique used for the navigation solution of the present disclosure to optimize the accuracy and the consistency of the navigation solution. The accuracy and consistency is assessed by comparing the temporary background solution during the simulated outages to a reference solution. The reference solution may be one of the following examples: the absolute navigational information (e.g. GNSS), the forward integrated navigation solution in the device integrating the available sensors with the absolute navigational information (e.g. GNSS) and possibly with the optional speed or velocity readings, a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation.

It is further contemplated that the present method and apparatus can be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the present method and apparatus can be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be capable of relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the present method and apparatus can be used with various types of inertial sensors, other than MEMS based sensors described herein by way of example.

The embodiments and techniques described above may be implemented as a system or plurality of systems working in conjunction, or in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server or other devices.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A method for integrating online, dynamic wireless system modeling with a navigation solution about at least one wireless-enabled device, wherein the method builds an automatic, online, dynamic model configured to predict the received signal strength of a signal transmitted by at least one transceiver means at any location within a wireless network area, wherein the wireless network has an infrastructure, wherein the at least one transceiver means is configured to transmit a wireless signal comprising a power pattern, wherein the at least one transceiver means constitutes the infrastructure of the wireless network, wherein the at least one device is configured to receive the signal(s) from the at least one transceiver means and wherein the at least one device comprises inertial sensors, the method comprising:

receiving the power pattern(s) transmitted from the at least one transceiver means, wherein the power pattern comprises:
i. information that identifies the at least one transmitting transceiver means, and information that identifies any other transceiver means in the area and visible by the at least one transmitting transceiver means,
ii. power information for a signal transmitted by the at least one transmitting transceiver means, and
iii. received signal strength information of signals transmitted by the any other transceiver means in the area and visible by the at least one transmitting transceiver means;

and further comprising:
a. processing information that identifies the at least one transceiver means to locate the at least one transceiver means,
b. building the automatic, online, dynamic model configured to predict the received signal strength of a signal transmitted by the at least one transceiver means at any location within the area, and
c. integrating the model with the navigation solution, wherein the navigation solution is based at least in part on output of the inertial sensors.

2. The method of claim 1, wherein integrating the model with the navigation solution comprises any one or any combination of:
a. using the wireless model to calculate a position of the at least one device, and integrating said position with the navigation solution;
b. using the wireless model to calculate a position of the at least one device, integrating said position with the navigation solution, and calculating an accuracy measure of the at least one device position, wherein the accuracy measure is utilized when the position is integrated with the navigation solution;
c. updating the navigation solution using the predicted received signal strength from the wireless model or a distance calculated from the predicted received signal strength between the at least one device and the at least one transceiver;
d. updating the navigation solution using the predicted received signal strength from the wireless model or a distance calculated from the predicted received signal strength between the at least one device and the at least one transceiver, and calculating an accuracy measure of the predicted received signal strength from the wireless model or the distance calculated from said predicted received signal strength, wherein the accuracy measure is utilized when the navigation solution is updated; and
e. utilizing the navigation solution for at least one of:
i. assisting in the building of the wireless model; and
ii. verifying and correct the built wireless model.

3. The method of claim 1, wherein the wireless model is one of the following:
a. an online propagation model of the at least one transceiver means, wherein the propagation model relates the received signal strength from the at least one transceiver means to a distance from the at least one transceiver means,
b. an online power profile of the at least one transceiver means, wherein the power profile relates the received signal strength from the at least one transceiver means to a location in the wireless network area, and
c. a combination of the propagation model and the online power profile of the at least one transceiver means.

4. The method of claim 3, wherein the wireless models are built using at least one of:
 a. an adaptive, calibrated best-fit mathematical formula;
 b. an adaptive, calibrated conditional probabilistic approach; and
 c. a combination of an adaptive, calibrated hybrid approach that combines a best fit mathematical model and a conditional probabilistic approach.

5. The method of claim 1, wherein the wireless models undergo at least one of:
 a. online, automatic, dynamic, and adaptive verification and correction; and
 b. online, automatic, dynamic, and adaptive verification and correction, wherein the verification and the correction of the models occurs periodically.

6. The method of claim 1, wherein the method further comprises at least one of:
 a. calculating an accuracy measure of the predicted signal strength; and
 b. calculating an accuracy measure of the predicted signal strength, wherein the accuracy measure is calculated by:
  i. calculating a conditional probability of the signal strength conditioned on, or given, the information in the power patterns,
  ii. calculating a variance of the conditional probability, and
  iii. converting the variance into an accuracy measure of the predicted received signal strength.

7. The method of claim 1, wherein the method further comprises at least one of:
 a. determining the location(s) of the at least one transceiver means by at least one of:
  i. using a table containing the location(s) of the at least one transceiver means indexed by the information that identifies the at least one transceiver means; and
  ii. encoding the location(s) of the at least one transceiver means in the power patterns transmitted by the at least one transceiver means;
 b. calculating the location(s) of the at least one transceiver means; and
 c. utilizing the navigation solution to determine the location(s) of the at least one transceiver means or assist in the determination of the locations(s) of the at least one transceiver means.

8. The method of any one of claim 1, 2, 3, 5, 6 or 7, wherein the power patterns transmitted by the at least one transceiver means are broadcasted wirelessly or transmitted through a wired network to the at least one processor.

9. The method of claim 1 wherein the at least one device communicates with the at least one processor through:
 a. wireless communication,
 b. wired communication, or
 c. by embedding the at least one processor inside the at least one wireless-enabled device in a single device.

10. The method of claim 1, wherein the at least one processor is further capable of ranking the at least one transceiver means.

11. The method of claim 10, wherein the ranking of the at least one transceiver means is achieved by:
 a. obtaining a power profile of the at least one transceiver means,
 b. merging all power profiles of all the at least one transceiver means to construct a radio-map of the area,
 c. applying a principle component analysis to the constructed radio map, and
 d. ranking the at least one transceiver means according to the positioning discrimination significance of each.

12. The method of claim 11, wherein the ranking of the plurality of transceivers means in the wireless area network is calculated by:
 a. obtaining the principle component analysis transformation matrix, wherein the matrix comprises columns and each column has a number of elements equal to the number of the plurality of transceivers means in the wireless area network, and
 b. ranking, for each column in the principle component analysis transformation matrix, the plurality of transceivers according to their corresponding absolute numerical values in that column of the principle component analysis transformation matrix.

13. The method of claim 11, wherein the ranking of the at least one transceiver means is used to calculate an accuracy measure of a position of a wireless-enabled device calculated using received signals strength from the at least one transceiver means.

14. The method of claim 11, wherein the integration of the wireless model with the navigation solution utilizes the ranking of the at least one transceiver means.

15. The method of claim 1, wherein the at least one processor is further operative to do at least one of:
 a. running a pre-processing routine to de-noise the wireless signals or to smooth the received signal strength measurements;
 b. performing multipath assessment and rejection for the wireless signals and measurements; and
 c. performing multipath assessment and rejection for the wireless signals and measurements, wherein the multipath assessment and rejection is performed using the navigation solution.

16. The method of claim 2, wherein the wireless model is one of the following:
 a. an online propagation model of the at least one transceiver means, wherein the propagation model relates the received signal strength from the at least one transceiver means to a distance from the at least one transceiver means,
 b. an online power profile of the at least one transceiver means, wherein the power profile relates the received signal strength from the at least one transceiver means to a location in the wireless network area, and
 c. a combination of the propagation model and the online power profile of the at least one transceiver means.

17. The method of claim 16, wherein the wireless models are built using at least one of:
 a. an adaptive, calibrated best-fit mathematical formula;
 b. an adaptive, calibrated conditional probabilistic approach; and
 c. a combination of an adaptive, calibrated hybrid approach that combines a best fit mathematical model and a conditional probabilistic approach.

18. The method of claim 2, wherein the wireless models undergo at least one of:
 a. online, automatic, dynamic, and adaptive verification and correction; and
 b. online, automatic, dynamic, and adaptive verification and correction, wherein the verification and the correction of the models occurs periodically.

19. The method of claim 3, wherein the wireless models undergo at least one of:
 a. online, automatic, dynamic, and adaptive verification and correction; and b. online, automatic, dynamic, and adaptive verification and correction, wherein the verification and the correction of the models occurs periodically.

20. The method of claim 4, wherein the wireless models undergo at least one of:
   a. online, automatic, dynamic, and adaptive verification and correction; and
   b. online, automatic, dynamic, and adaptive verification and correction, wherein the verification and the correction of the models occurs periodically.

21. The method of claim 16, wherein the wireless models undergo at least one of:
   a. online, automatic, dynamic, and adaptive verification and correction; and
   b. online, automatic, dynamic, and adaptive verification and correction, wherein the verification and the correction of the models occurs periodically.

22. The method of claim 2, wherein the method further comprises at least one of:
   a. calculating an accuracy measure of the predicted signal strength; and
   b. calculating an accuracy measure of the predicted signal strength, wherein the accuracy measure is calculated by:
      i. calculating a conditional probability of the signal strength conditioned on, or given, the information in the power patterns,
      ii. calculating a variance of the conditional probability, and
      iii. converting the variance into an accuracy measure of the predicted received signal strength.

23. The method of claim 3, wherein the method further comprises at least one of:
   a. calculating an accuracy measure of the predicted signal strength; and
   b. calculating an accuracy measure of the predicted signal strength, wherein the accuracy measure is calculated by:
      i. calculating a conditional probability of the signal strength conditioned on, or given, the information in the power patterns,
      ii. calculating a variance of the conditional probability, and
      iii. converting the variance into an accuracy measure of the predicted received signal strength.

24. The method of claim 16, wherein the method further comprises at least one of:
   a. calculating an accuracy measure of the predicted signal strength; and
   b. calculating an accuracy measure of the predicted signal strength, wherein the accuracy measure is calculated by:
      i. calculating a conditional probability of the signal strength conditioned on, or given, the information in the power patterns,
      ii. calculating a variance of the conditional probability, and
      iii. converting the variance into an accuracy measure of the predicted received signal strength.

25. The method of claim 5, wherein the method further comprises at least one of:
   a. calculating an accuracy measure of the predicted signal strength; and
   b. calculating an accuracy measure of the predicted signal strength, wherein the accuracy measure is calculated by:
      i. calculating a conditional probability of the signal strength conditioned on, or given, the information in the power patterns,
      ii. calculating a variance of the conditional probability, and
      iii. converting the variance into an accuracy measure of the predicted received signal strength.

26. The method of claim 19, wherein the method further comprises at least one of:
   a. calculating an accuracy measure of the predicted signal strength; and
   b. calculating an accuracy measure of the predicted signal strength, wherein the accuracy measure is calculated by:
      i. calculating a conditional probability of the signal strength conditioned on, or given, the information in the power patterns,
      ii. calculating a variance of the conditional probability, and
      iii. converting the variance into an accuracy measure of the predicted received signal strength.

27. The method of claim 21, wherein the method further comprises at least one of:
   a. calculating an accuracy measure of the predicted signal strength; and
   b. calculating an accuracy measure of the predicted signal strength, wherein the accuracy measure is calculated by:
      i. calculating a conditional probability of the signal strength conditioned on, or given, the information in the power patterns,
      ii. calculating a variance of the conditional probability, and
      iii. converting the variance into an accuracy measure of the predicted received signal strength.

28. The method of claim 2, wherein the method further comprises at least one of:
   a. determining the location(s) of the at least one transceiver means by at least one of:
      i. using a table containing the location(s) of the at least one transceiver means indexed by the information that identifies the at least one transceiver means; and
      ii. encoding the location(s) of the at least one transceiver means in the power patterns transmitted by the at least one transceiver means;
   b. calculating the location(s) of the at least one transceiver means; and
   c. utilizing the navigation solution to determine the location(s) of the at least one transceiver means or assist in the determination of the locations(s) of the at least one transceiver means.

29. The method of claim 3, wherein the method further comprises at least one of:
   a. determining the location(s) of the at least one transceiver means by at least one of:
      i. using a table containing the location(s) of the at least one transceiver means indexed by the information that identifies the at least one transceiver means; and
      ii. encoding the location(s) of the at least one transceiver means in the power patterns transmitted by the at least one transceiver means;
   b. calculating the location(s) of the at least one transceiver means; and
   c. utilizing the navigation solution to determine the location(s) of the at least one transceiver means or assist in the determination of the locations(s) of the at least one transceiver means.

30. The method of claim 5, wherein the method further comprises at least one of:
   a. determining the location(s) of the at least one transceiver means by at least one of:
      i. using a table containing the location(s) of the at least one transceiver means indexed by the information that identifies the at least one transceiver means; and
      ii. encoding the location(s) of the at least one transceiver means in the power patterns transmitted by the at least one transceiver means;
   b. calculating the location(s) of the at least one transceiver means; and
   c. utilizing the navigation solution to determine the location(s) of the at least one transceiver means or assist in the determination of the locations(s) of the at least one transceiver means.

31. The method of claim 6, wherein the method further comprises at least one of:
   a. determining the location(s) of the at least one transceiver means by at least one of:
      i. using a table containing the location(s) of the at least one transceiver means indexed by the information that identifies the at least one transceiver means; and
      ii. encoding the location(s) of the at least one transceiver means in the power patterns transmitted by the at least one transceiver means;
   b. calculating the location(s) of the at least one transceiver means; and
   c. utilizing the navigation solution to determine the location(s) of the at least one transceiver means or assist in the determination of the locations(s) of the at least one transceiver means.

32. The method of claim 16, wherein the method further comprises at least one of:
   a. determining the location(s) of the at least one transceiver means by at least one of:
      i. using a table containing the location(s) of the at least one transceiver means indexed by the information that identifies the at least one transceiver means; and
      ii. encoding the location(s) of the at least one transceiver means in the power patterns transmitted by the at least one transceiver means;
   b. calculating the location(s) of the at least one transceiver means; and
   c. utilizing the navigation solution to determine the location(s) of the at least one transceiver means or assist in the determination of the locations(s) of the at least one transceiver means.

33. The method of claim 19, wherein the method further comprises at least one of:
   a. determining the location(s) of the at least one transceiver means by at least one of:
      i. using a table containing the location(s) of the at least one transceiver means indexed by the information that identifies the at least one transceiver means; and
      ii. encoding the location(s) of the at least one transceiver means in the power patterns transmitted by the at least one transceiver means;
   b. calculating the location(s) of the at least one transceiver means; and
   c. utilizing the navigation solution to determine the location(s) of the at least one transceiver means or assist in the determination of the locations(s) of the at least one transceiver means.

34. The method of claim 21, wherein the method further comprises at least one of:
   a. determining the location(s) of the at least one transceiver means by at least one of:
      i. using a table containing the location(s) of the at least one transceiver means indexed by the information that identifies the at least one transceiver means; and
      ii. encoding the location(s) of the at least one transceiver means in the power patterns transmitted by the at least one transceiver means;
   b. calculating the location(s) of the at least one transceiver means; and
   c. utilizing the navigation solution to determine the location(s) of the at least one transceiver means or assist in the determination of the locations(s) of the at least one transceiver means.

35. The method of claim 22, wherein the method further comprises at least one of:
   a. determining the location(s) of the at least one transceiver means by at least one of:
      i. using a table containing the location(s) of the at least one transceiver means indexed by the information that identifies the at least one transceiver means; and
      ii. encoding the location(s) of the at least one transceiver means in the power patterns transmitted by the at least one transceiver means;
   b. calculating the location(s) of the at least one transceiver means; and
   c. utilizing the navigation solution to determine the location(s) of the at least one transceiver means or assist in the determination of the locations(s) of the at least one transceiver means.

36. The method of claim 23, wherein the method further comprises at least one of:
   a. determining the location(s) of the at least one transceiver means by at least one of:
      i. using a table containing the location(s) of the at least one transceiver means indexed by the information that identifies the at least one transceiver means; and
      ii. encoding the location(s) of the at least one transceiver means in the power patterns transmitted by the at least one transceiver means;
   b. calculating the location(s) of the at least one transceiver means; and
   c. utilizing the navigation solution to determine the location(s) of the at least one transceiver means or assist in the determination of the locations(s) of the at least one transceiver means.

37. The method of claim 24, wherein the method further comprises at least one of:
   a. determining the location(s) of the at least one transceiver means by at least one of:
      i. using a table containing the location(s) of the at least one transceiver means indexed by the information that identifies the at least one transceiver means; and
      ii. encoding the location(s) of the at least one transceiver means in the power patterns transmitted by the at least one transceiver means;
   b. calculating the location(s) of the at least one transceiver means; and
   c. utilizing the navigation solution to determine the location(s) of the at least one transceiver means or assist in the determination of the locations(s) of the at least one transceiver means.

38. The method of claim 25, wherein the method further comprises at least one of:
   a. determining the location(s) of the at least one transceiver means by at least one of:

i. using a table containing the location(s) of the at least one transceiver means indexed by the information that identifies the at least one transceiver means; and ii. encoding the location(s) of the at least one transceiver means in the power patterns transmitted by the at least one transceiver means;

b. calculating the location(s) of the at least one transceiver means; and c. utilizing the navigation solution to determine the location(s) of the at least one transceiver means or assist in the determination of the locations(s) of the at least one transceiver means.

39. The method of claim 26, wherein the method further comprises at least one of:

a. determining the location(s) of the at least one transceiver means by at least one of:

i. using a table containing the location(s) of the at least one transceiver means indexed by the information that identifies the at least one transceiver means; and ii. encoding the location(s) of the at least one transceiver means in the power patterns transmitted by the at least one transceiver means;

b. calculating the location(s) of the at least one transceiver means; and c. utilizing the navigation solution to determine the location(s) of the at least one transceiver means or assist in the determination of the locations(s) of the at least one transceiver means.

40. The method of claim 27, wherein the method further comprises at least one of:

a. determining the location(s) of the at least one transceiver means by at least one of:

i. using a table containing the location(s) of the at least one transceiver means indexed by the information that identifies the at least one transceiver means; and ii. encoding the location(s) of the at least one transceiver means in the power patterns transmitted by the at least one transceiver means;

b. calculating the location(s) of the at least one transceiver means; and c. utilizing the navigation solution to determine the location(s) of the at least one transceiver means or assist in the determination of the locations(s) of the at least one transceiver means.

41. The method of any one of claim 16, 19, 21, 28, 29, 30, 31, or 33, wherein the power patterns transmitted by the at least one transceiver means are broadcasted wirelessly or transmitted through a wired network to the at least one processor.

42. A system for integrating online, dynamic wireless system modeling with a navigation solution about at least one wireless-enabled device, wherein the system builds an automatic, online, dynamic model configured to predict the received signal strength of a signal transmitted by at least one transceiver means at any location within a wireless network area, wherein the wireless network has an infrastructure, the system comprising:

a. at least one transceiver means configured to transmit a wireless signal comprising a power pattern, wherein the at least one transceiver means constitutes the infrastructure of the wireless network, wherein the power pattern comprises:

i. information that identifies the at least one transmitting transceiver means, and information that identifies any other transceiver means in the area and visible by the at least one transmitting transceiver means, ii. power information for a signal transmitted by the at least one transmitting transceiver means, and iii. received signal strength information of signals transmitted by the any other transceiver means in the area and visible by the at least one transmitting transceiver means, b. at least one wireless-enabled device configured to receive the signal(s) from the at least one transceiver means, and wherein the at least one device comprises inertial sensors, and c. at least one processor configured to receive the power pattern(s) transmitted from the at least one transceiver means and operative to:

i. process the information that identifies the at least one transceiver means to locate the at least one transceiver means, ii. build the automatic, online, dynamic model configured to predict the received signal strength of a signal transmitted by the at least one transceiver means at any location within the area, and iii. integrate the model with the navigation solution, wherein the navigation solution is based at least in part on output of the inertial sensors.

43. The system of claim 42, wherein the processor is operative to integrate the model with the navigation solution by any one or any combination of:

a. using the wireless model to calculate a position of the at least one device, and integrating said position with the navigation solution;

b. using the wireless model to calculate a position of the at least one device, integrating said position with the navigation solution, and calculating an accuracy measure of the at least one device position, wherein the accuracy measure is utilized when the position is integrated with the navigation solution;

c. updating the navigation solution using the predicted received signal strength from the wireless model or a distance calculated from the predicted received signal strength between the at least one device and the at least one transceiver;

d. updating the navigation solution using the predicted received signal strength from the wireless model or a distance calculated from the predicted received signal strength between the at least one device and the at least one transceiver, and calculating an accuracy measure of the predicted received signal strength from the wireless model or the distance calculated from said predicted received signal strength, wherein the accuracy measure is utilized when the navigation solution is updated; and e. utilizing the navigation solution for at least one of:

i. assisting in the building of the wireless model; and ii. verifying and correct the built wireless model.

44. The system of any one of claim 42 or 43, wherein the wireless model is one of the following:

a. an online propagation model of the at least one transceiver means, wherein the propagation model relates the received signal strength from the at least one transceiver means to a distance from the at least one transceiver means, b. an online power profile of the at least one transceiver means, wherein the power profile relates the received signal strength from the at least one transceiver means to a location in the wireless network area, or c. a combination of the propagation model and the online power profile of the at least one transceiver means.

45. The system of claim 44, wherein the power patterns transmitted by the at least one transceiver means are broadcasted wirelessly or transmitted through a wired network to the at least one processor.

46. The system of any one of claim 42 or 43, wherein the power patterns transmitted by the at least one transceiver means are broadcasted wirelessly or transmitted through a wired network to the at least one processor.

47. The system of claim 42 wherein the at least one device communicates with the at least one processor through:
   a. wireless communication,
   b. wired communication, or
   c. by embedding the at least one processor inside the at least one wireless-enabled device in a single device.

* * * * *